United States Patent
Allmendinger (10) Patent No.: US 7,267,092 B2
(45) Date of Patent: Sep. 11, 2007

(54) APPARATUS INCLUDING A PREFORMED ONE-PIECE SEAL

(75) Inventor: Otto Karl Allmendinger, Texarkana, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 0 days.

(21) Appl. No.: 11/282,338

(22) Filed: Nov. 18, 2005

(65) Prior Publication Data
US 2007/0113818 A1     May 24, 2007

(51) Int. Cl.
*F02F 7/00* (2006.01)
(52) U.S. Cl. .................. 123/195 R; 277/643
(58) Field of Classification Search ............ 123/195 R, 123/65 R, 195 C; 277/643, 606, 591–605
See application file for complete search history.

(56) References Cited

U.S. PATENT DOCUMENTS

| | | | |
|---|---|---|---|
| 4,101,137 A | 7/1978 | Travis | |
| 4,377,993 A | 3/1983 | List | |
| 4,423,707 A | 1/1984 | Sihon et al. | |
| 4,434,756 A * | 3/1984 | Nilsson et al. | 123/195 R |
| 4,484,751 A | 11/1984 | Deuring | |
| 4,974,973 A | 12/1990 | Janeke | |
| 5,456,229 A | 10/1995 | Emmerich | |
| 5,615,650 A | 4/1997 | Araki | |
| 5,934,686 A | 8/1999 | Ottenschläger | |
| 6,418,903 B2 | 7/2002 | Müller et al. | |

* cited by examiner

*Primary Examiner*—Stephen K. Cronin
*Assistant Examiner*—Hyder Ali
(74) *Attorney, Agent, or Firm*—Pearne & Gordon LLP (57) ABSTRACT

An apparatus includes a crankshaft provided with a first bearing and a second bearing. The apparatus further includes a first bearing seal positioned adjacent the first bearing and a second bearing seal positioned adjacent the second bearing. The apparatus further includes a preformed one-piece seal including a first endless loop, a second endless loop and a first intermediate seal portion connected between the first and second endless loops. The first endless loop engages a peripheral surface of the first bearing seal while the second endless loop engages a peripheral surface of the second bearing seal.

20 Claims, 6 Drawing Sheets

120
APPARATUS INCLUDING A PREFORMED ONE-PIECE SEAL

FIELD OF THE INVENTION

The present invention relates to apparatus that include a seal, and more particularly to apparatus that include a preformed one-piece seal.

BACKGROUND OF THE INVENTION

As described in U.S. Pat. No. 5,456,229, it is known to provide a one-piece seal between an upper crankcase part, a lower crankcase part, and heat resistant rings. The '229 patent discloses roller bearings that are sealed on the outside by cover rings and encompassed by the heat resistant rings. Circular parts of the one-piece seal are configured to be received in grooves formed in the heat resistant rings. Connecting parts of the one-piece seal are configured to be received in associated grooves in the lower housing part and/or the upper housing part.

However, the '229 patent does not address all of the possible issues concerning an apparatus that has a one-piece member. As such, there is a continuing need for developments concerning apparatus that include a one-piece member for providing a reliable fluid seal for a crankcase.

SUMMARY OF THE INVENTION

In accordance with one aspect, an apparatus includes a crankshaft provided with a first bearing and a second bearing. The apparatus further includes a first bearing seal positioned adjacent the first bearing without encompassing the first bearing and a second bearing seal positioned adjacent the second bearing without encompassing the second bearing. The apparatus further includes a preformed one-piece seal including a first endless loop, a second endless loop and a first intermediate seal portion connected between the first and second endless loops. The first endless loop engages a peripheral surface of the first bearing seal and the second endless loop engages a peripheral surface of the second bearing seal.

In accordance with another aspect, an apparatus includes a crankcase including a first bearing seat and a first bearing seal seat positioned adjacent the first bearing seat. The crankcase further includes a second bearing seat and a second bearing seal seat positioned adjacent the second bearing seat. The apparatus further includes a crankshaft rotatable relative to the crankcase. The crankshaft is provided with a first bearing engaging the first bearing seat and a second bearing engaging the second bearing seat. The apparatus further includes a first bearing seal positioned at least partially within the first bearing seal seat and a second bearing seal positioned at least partially within the second bearing seal seat. The apparatus also includes a preformed one-piece seal including a first endless loop, a second endless loop and a first intermediate seal portion connected between the first and second endless loops. The first endless loop engages a peripheral surface of the first bearing seal and a surface of the first bearing seal seat. The second endless loop also engages a peripheral surface of the second bearing seal and a surface of the second bearing seal seat.

In accordance with still another aspect, an apparatus includes a crankcase including a first bearing seat and a first bearing seal seat positioned adjacent the first bearing seat. The crankcase further includes a second bearing seat and a second bearing seal seat positioned adjacent the second bearing seat. The apparatus also includes a crankshaft rotatable relative to the crankcase. The crankshaft is provided with a first bearing at least partially received in the first bearing seat and a second bearing at least partially received in the second bearing seat. The apparatus also includes a first bearing seal and a second bearing seal. The first bearing seal is at least partially positioned within the first bearing seal seat without encompassing the first bearing. The second bearing seal is at least partially positioned within the second bearing seal seat without encompassing the second bearing. The apparatus also includes a preformed one-piece seal including a first endless loop, a second endless loop and a first intermediate seal portion connected between the first and second endless loops. The first endless loop engages a peripheral surface of the first bearing seal and a surface of the first bearing seal seat. The second endless loop also engages a peripheral surface of the second bearing seal and a surface of the second bearing seal seat.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF EXAMPLE EMBODIMENTS

Certain terminology is used herein for convenience only and is not to be taken as a limitation on the present invention. Further, in the drawings, the same reference numerals are employed for designating the same elements.

Figure 1:
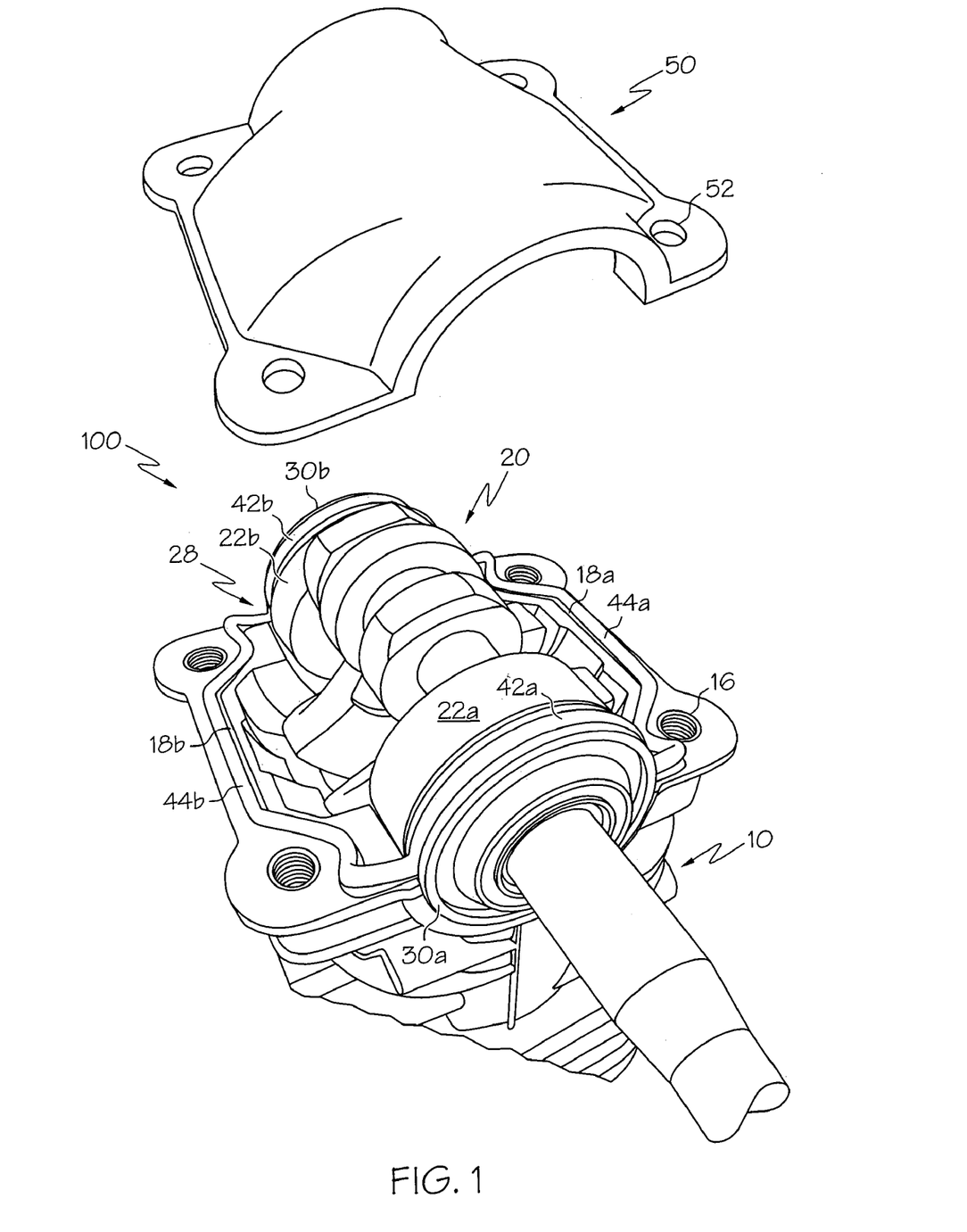
FIG. 1 is an exploded perspective view of an example of an apparatus including aspects of the present invention.

The present invention includes an apparatus 100 that can include various features and/or combinations of features illustrated in FIG. 1. For example, the apparatus 100 can include features, or combinations of features, such as an upper crankcase portion, a lower crankcase portion, a crankshaft apparatus and/or a sealing apparatus.

The upper crankcase portion is adapted to cooperate with a lower crankcase portion to define an interior crankcase cavity while also rotatably supporting a crankshaft apparatus. The upper and lower crankcase portions can also cooperate to define one or more seats adapted to accommodate the crankshaft apparatus.

Figure 2:
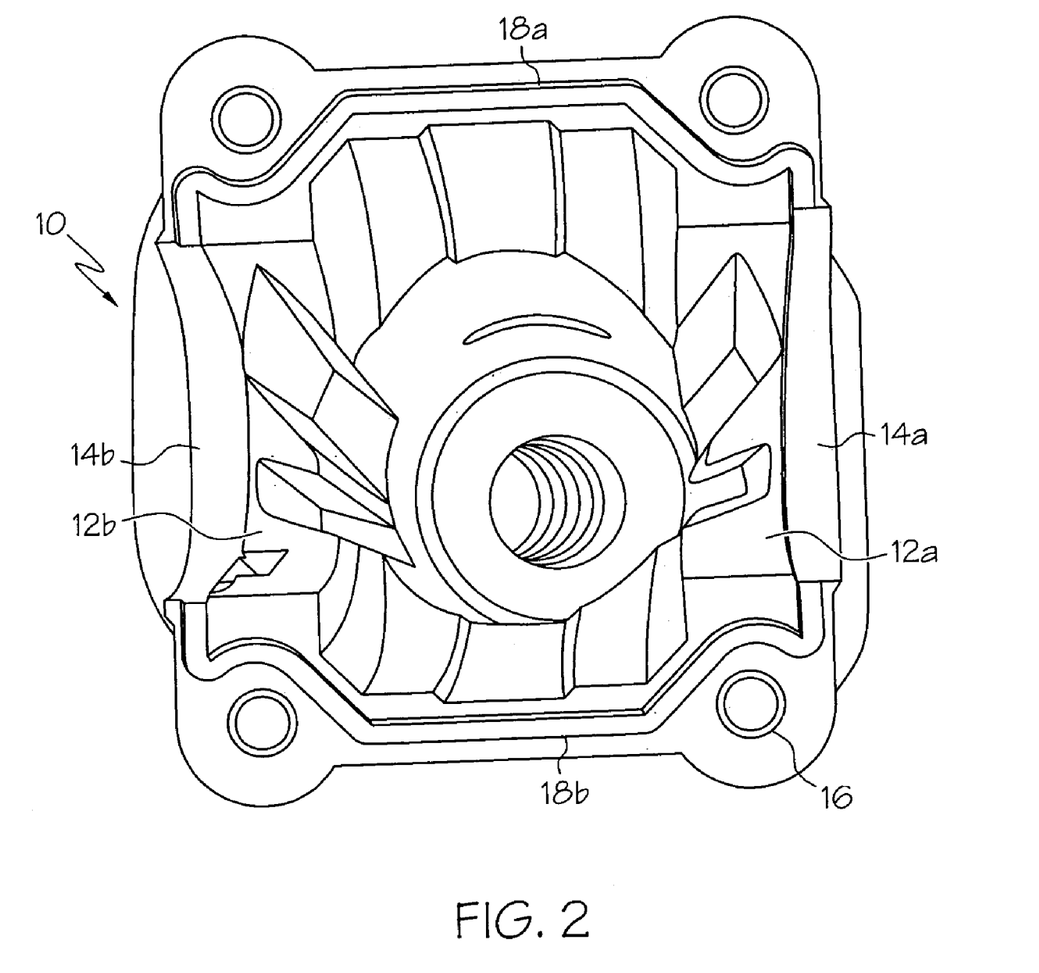
FIG. 2 depicts an lower perspective view of an upper crankcase portion including aspects of the present invention.

FIG. 2 depicts a lower perspective view of an example of an upper crankcase portion 10 that can be used in accordance with aspects of the present invention. In the example illustrated in FIG. 1, the upper crankcase portion 10 includes a first bearing seat 12a and a second bearing seat 12b configured to at least partially receive and engage respective bearings of the crankshaft apparatus. The upper crankcase portion 10 further includes a first bearing seal seat 14a and a second bearing seal seat 14b configured to at least partially receive respective bearing seals of a sealing apparatus.

As shown, each bearing seat 12a, 12b and bearing seal seat 14a, 14b can include semi-cylindrical seat portions. It is contemplated that the seats may include various cylindrical surfaces, such as a circular-cylindrical surface or a conical-cylindrical surface or other cylindrical surface shapes. In further embodiments, the seats may include a non-cylindrical surface. For example, the seat may include half of a polygonal shape having three or more sides. In addition, each seat can include other non-polygonal or non-cylindrical shapes. Moreover, while each illustrated seat of the upper crankcase portion 10 is semi-cylindrical, it is contemplated that further seats may include more or less than half of the cylindrical seat portion formed between the upper and lower crankcase portions. Likewise, with non-cylindrical shapes, the seats of the lower crankcase portion may include more or less than half of the seat portion formed between the upper and lower crankcase portions.

As further shown, each bearing seat 12a, 12b has a dimension, such as a radius, that can be substantially the same to accommodate substantially identical bearings of a crankshaft apparatus. In further embodiments, bearing seats may have different dimensions to accommodate nonidentical bearings of a crankshaft apparatus. As also illustrated, each bearing seal seat 14a, 14b can have a second dimension, such as a second radius, that can be substantially the same to accommodate substantially identical bearing seals of a sealing apparatus. In further embodiments, each bearing seal seat may have different dimensions to accommodate nonidentical bearing seals of a sealing apparatus.

The bearing seat and the bearing seal seat may have identical or different dimensions. Providing identical seats may reduce processing steps for machining the crankcase. However, providing different dimensions can encourage appropriate alignment between a bearing and a bearing seal positioned adjacent the bearing. In one example, each bearing seat has a dimension that is greater than the dimension of the corresponding bearing seal seat. Providing the bearing seats with a greater dimension than the bearing seal seat can help trap the bearings with respect to the crankcase portion to isolate the bearing seals from axial forces that might otherwise be imposed by the crankshaft. Alternatively, each bearing seat can have a dimension that is less than the dimension of the corresponding bearing seal seat. For example, as shown, the first bearing seat 12a includes a radius that is smaller than a radius of the first bearing seal seat 14a. Likewise, the second bearing seat 12b includes a radius that is smaller than a radius of the second bearing seal seat 14b. Although not shown, one or both bearing seal seats may include a groove to receive a snap ring configured to maintain the proper axial alignment of the crankshaft apparatus and the sealing apparatus with respect to the crankcase. In addition or alternatively, one or both bearing seal seats may include an outer shoulder (not shown) adapted to trap the crankshaft apparatus and/or the sealing apparatus to maintain proper orientation with respect to the crankcase.

One or both of the upper and lower crankcase portions can include optional intermediate seal grooves. For example, as shown in FIG. 2, the upper crankcase portion 10 includes a first intermediate seal groove 18a extending between the first bearing seal seat 14a and the second bearing seal seat 14b. The upper crankcase portion 10 can also include a second intermediate seal groove 18b extending between the first bearing seal seat 14a and the second bearing seal seat 14b. While optional, the first and second intermediate seal grooves can help properly orient intermediate seal portions as described more fully below.

Figure 3:
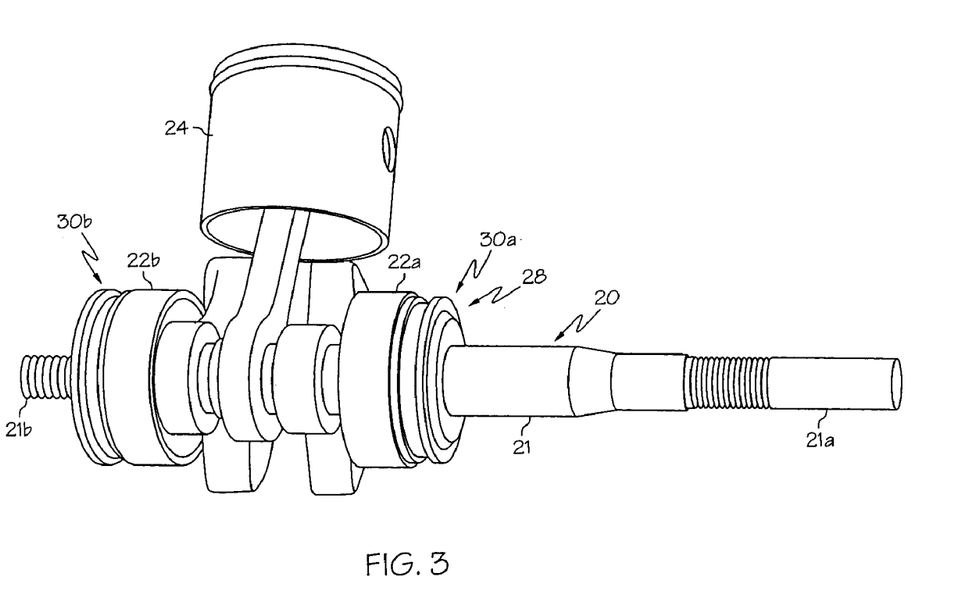
FIG. 3 is a perspective view of a crankshaft apparatus and a portion of a sealing apparatus including aspects of the present invention.

FIG. 3 depicts a crankshaft apparatus 20 with a crankshaft 21 operably connected to a piston 24. The piston 24 is configured to reciprocate within a cylinder bore in the upper crankcase portion 10. The crankshaft 21 is also provided with a first bearing 22a and a second bearing 22b. Although not required, the bearings 22a, 22b may be identical to one another. In example embodiments, the bearings 22a, 22b can include ball or roller bearing assemblies having an inner race positioned on the crankshaft 21 and an outer race adapted to be received in a respective bearing seat of the upper and/or lower crankcase portion.

Figure 4:
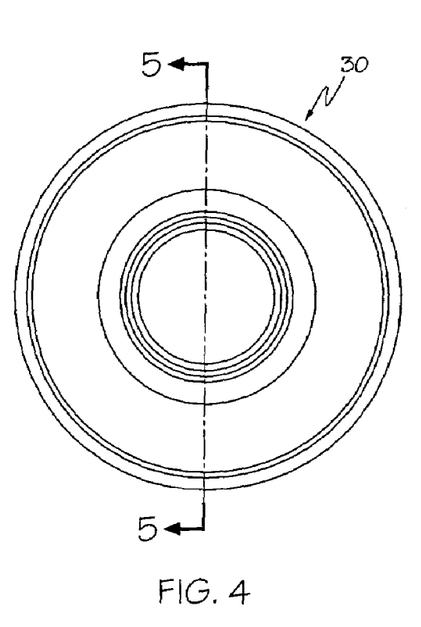
FIG. 4 is a side elevational view of an end cap of the sealing apparatus.
Figure 5:
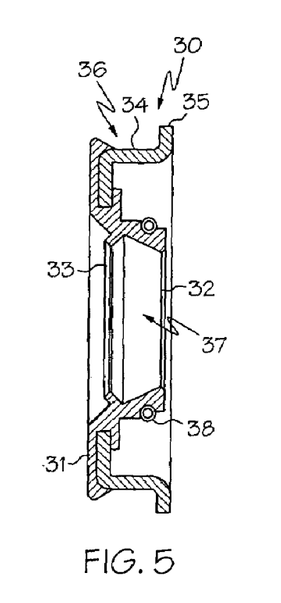
FIG. 5 is a sectional view of the end cap along line 5-5 of FIG. 4.

FIGS. 3-5 illustrate a portion of a sealing apparatus 28 adapted to provide a fluid seal with the crankshaft 21. For example, the sealing apparatus 28 can include a first bearing seal 30a positioned adjacent the first bearing 22a and a second bearing seal 30b positioned adjacent the second bearing 22b. Although not required, the bearing seals 30a, 30b may be identical to one another. In one example, the bearing seals 30a, 30b can be constructed as shown by the bearing seal 30 illustrated in FIGS. 4 and 5.

As shown in FIG. 5, the bearing seal 30 can include a first body portion 35 and a second body portion 31 attached to the first body portion 35. For instance, the second body portion 31 may be molded or otherwise formed such that it is attached to the first body portion 35. In further examples, the first and second body portions are formed separately and later attached by sonic welding, adhesives or other attachment techniques.

The first body portion 35 can include a metal material although plastic, resins, composites or other relatively rigid and/or durable materials may be used. The second body portion can include rubber or other elastic and/or resilient materials. The second body portion 31 of the bearing seal 30 can also include a through passage 37 adapted to accommodate the crankshaft 21. The through passage 37 can also be provided with a least one sealing lip configured to engage and thereby provide a fluid seal with an outer surface of the crankshaft 21. For example, as shown in FIG. 5, the through passage 37 includes a first sealing lip 32 and a second sealing lip 33. At least one of the sealing lips, if provided, may also be configured for preloading against the outer surface of the crankshaft 21. For example, as shown in FIG. 5, the first sealing lip 32 can be provided with a biasing member, such as a coil spring 38. The illustrated coil spring 38 is arranged in the shape of a torus that circumscribes an outer portion of the first sealing lip 32. The coil spring 38 can be preloaded to constrict the first sealing lip 32 against the outer surface of the crankshaft 21 to provide enhanced fluid sealing with the crankshaft. The bearing seal 30 can also include an optional groove 36 including an outer periphery 34 of the bearing seal 30. The groove 36 is adapted to receive and engage an endless loop of a one-piece seal as described more fully below. In the illustrated example, the groove 36 is defined by portions of the first body portion 35 and the second body portion 31. The groove, if provided, can also be defined entirely by the first body portion or the second body portion.

Figure 6:
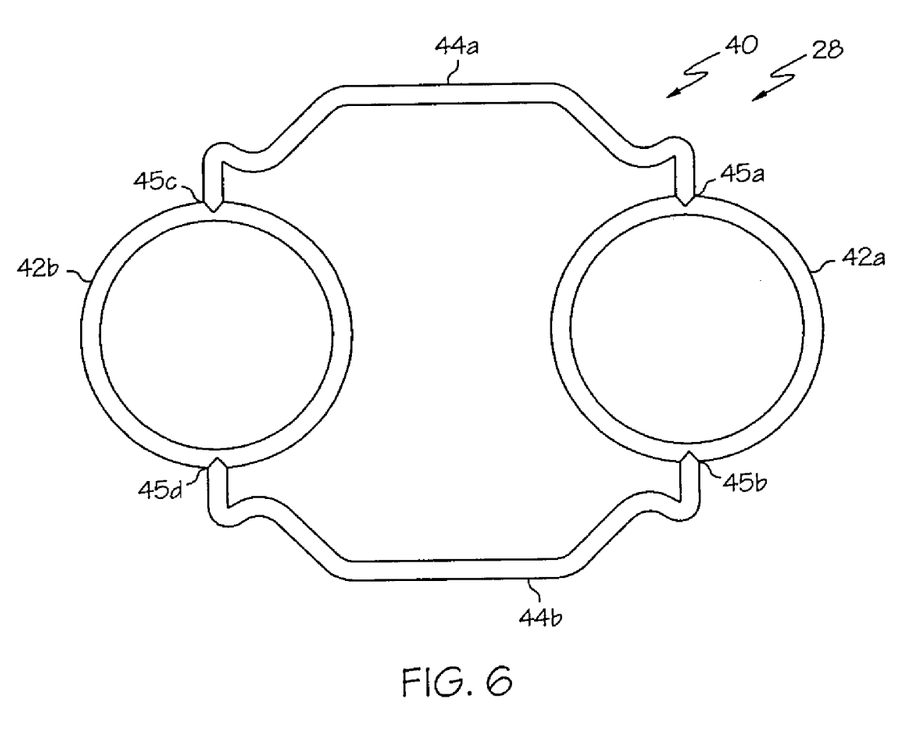
FIG. 6 is a top plan view of a one-piece seal of the sealing apparatus including aspects of the present invention.

FIG. 6 illustrates a top plan view of another portion of the sealing apparatus 28 including a one-piece seal 40. The one-piece seal 40 is adapted to provide a fluid seal between areas of the upper and lower crankcase portion and between areas of the first and second bearing seals and the first and second bearing seal seats.

The one-piece seal 40 includes a first endless loop 42a and a second endless loop 42b adapted to provide a fluid seal between the first and second bearing seals 30a, 30b and the first and second bearing seal seats 14a, 14b. As shown, the endless loops 42a, 42b may be circular. In further embodiments, the endless loops may include other shapes for conforming to the shape of the peripheral surface of the bearing seals and/or the shape of the surface of the bearing seal seats. The one-piece seal 40 further includes at least a first intermediate seal portion 44a connected between the first and second endless loops 42a, 42b. The first intermediate seal portion 44a is adapted to provide a fluid seal between areas of the upper and lower crankcase portions 10, 50. In further examples, the one-piece seal 40 can also include a second intermediate seal portion 44b connected between the first and second endless loops to provide a further fluid seal between further portions of the upper and lower crankcase portions 10, 50. Although not shown, the one-piece seal may also include three or more intermediate portions to provide a fluid seal between several areas of the upper and lower crankcase portions.

If provided with two intermediate portions, each intermediate portion may be connected to the first endless loop at various locations. For example, as shown in FIG. 6, the first intermediate seal portion 44a may be connected to the first endless loop 42a at a first location 45a and the second intermediate seal portion 44b may be connected to the first endless loop 42a at a second location 45b. Although not required, the second location 45b may be opposed to the first location 45a. For example, if the first endless loop 42a is circular, the second location 45b may be diametrically opposed to the first location 45a.

Each intermediate portion may also be connected to the second end less loop at various locations. For example, as further shown in FIG. 6, the first intermediate seal portion 44a may be connected to the second endless loop 42b at a third location 45c and the second intermediate seal portion 44b may be connected to the second endless loop 42b at a fourth location 45d. Although not required, the fourth location 45d may be opposed to the second location 45c. For example, of the second endless loop 42b is circular, the fourth location 45d may be diametrically opposed to the second location 45c.

Appropriate positioning of each attachment location may facilitate the sealing function between the bearing seals and the upper and lower crankcase portions. For example, as shown in FIG. 6, the providing the second location 45b in a position that is opposed to the first location 45a can allow the first endless loop 42a to be rotated 90 degrees such that the first endless loop extends along a first plane that is perpendicular to a plane of the first and second intermediate seal portions. Likewise, providing the fourth location 45d in a position that is opposed to the third location 45c can allow the second endless loop 42b to be rotated 90 degrees. Once rotated, the second endless loop 42b extends along a second plane that is parallel to the first plane and perpendicular to the plane of the first and second intermediate seal portions.

The one-piece seal 40 can be formed from rubber or other elastic and/or resilient materials. As shown in FIG. 6, the one-piece seal can be preformed prior to assembling the apparatus 100. For example, the one-piece seal can be injection molded or otherwise preformed prior to assembling. Although not required, the one-piece seal can be formed substantially along a common imaginary plane. For example, as shown in FIG. 6, the one-piece seal 40 is formed substantially along a common imaginary plane to simplify the forming process and to simplify stacking of multiple seals together prior to assembling the apparatus.

An example of a process for assembling the apparatus will now be described with reference to the figures. With reference to FIG. 3, a crankshaft apparatus 20 is provided with a first bearing 22a inserted over a first end 21a of the crankshaft 21 and a second bearing 22b inserted over a second end 21b of the crankshaft 21. Next, the first and second bearing seals 30a, 30b are inserted over respective ends 21a, 21b of the crankshaft. The first and second bearing seals 30a, 30b, are then slid over the crankshaft 21 until they are positioned adjacent a respective first and second bearing 22a, 22b of the crankshaft apparatus 20. Once in position, a fluid seal is provided at the connection between the bearing seals and the crankshaft.

Figure 7:
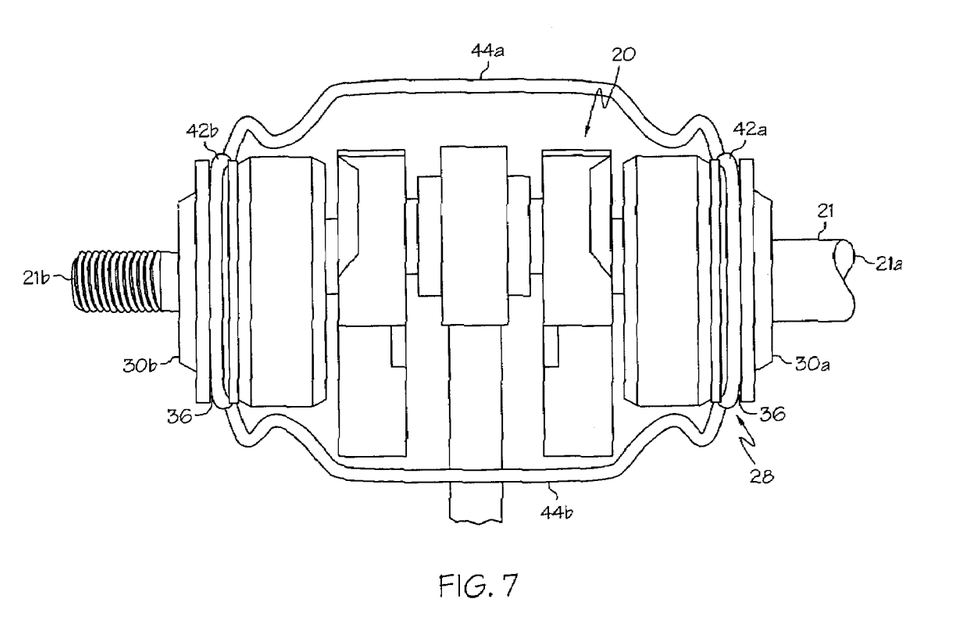
FIG. 7 is a top plan view of the crankshaft apparatus and the sealing apparatus of FIGS. 3 and 6.

The one-piece seal 40 illustrated in FIG. 6 is then installed on the bearing seals 30a, 30b as shown in FIG. 7. In order to install the one-piece seal 40, the first endless loop 42a is inserted over the first end 21a of the crankshaft 21. The first endless loop 42a is then rotated relative to the intermediate seal portions 44a, 44b and engaged with the peripheral surface 34 of the first bearing seal 30a. In the illustrated embodiment, the first endless loop 42a is positioned within the groove 36 of to engage the peripheral surface 34 of the first bearing seal 30a. Likewise, the second endless loop 42b is inserted over the second end 21b of the crankshaft 21. The second endless loop 42b is then rotated relative to the intermediate seal portions 44a, 44b and engaged with the peripheral surface 34 of the second bearing seal 30b. In the illustrated embodiment, the second endless loop 42b is positioned within the groove 36 of to engage the peripheral surface 34 of the second bearing seal 30b.

The crankshaft apparatus 20 and sealing apparatus 28 of FIG. 7 are then installed with respect to the upper crankcase portion 10 as shown in FIG. 1. For example, the first and second bearings 22a, 22b of the crankshaft assembly 20 are positioned to engage respective first and second bearing seats 12a, 12b of the upper crankcase portion 10. The first and second bearing seals 30a, 30b are also positioned at least partially within respective first and second bearing seal seats 14a, 14b of the upper crankcase portion 10. Once appropriately positioned, the first and second endless loops 42a, 42b respectively engage a surface of the groove 36 and a surface of the first and second bearing seal seats 14a, 14b. The first and second intermediate seal portions 44a, 44b are then inserted in respective intermediate seal grooves 18a, 18b of the upper crankcase portion 10. The lower crankcase portion can include apertures 52 adapted to receive fasteners (not shown) adapted to be threadingly received within mounting bores 16 of the upper crankcase portion 10. The fasteners are then tightened to complete assembly of the apparatus 100. Once assembled, the first and second intermediate seal portion 44a, 44b provides a fluid seal between areas of the upper and lower crankcase portions 10, 50. The first and second endless loops 42a, 42b provide a fluid seal between respective areas of the upper and lower crankcase portions 10, 50 and respective bearing seals 30a, 30b. The bearing seals 30a, 30b also provide a fluid seal with the crankshaft 21. Once appropriately installed, the sealing apparatus 28 can provide the interior crankcase cavity with a fluid tight seal.

From the above description of the invention, those skilled in the art will perceive improvements, changes and modifications. Such improvements, changes and modifications within the skill of the art are intended to be covered by the appended claims.

What is claimed:

1. An apparatus including:
   a crankshaft provided with a first bearing and a second bearing;
   a first bearing seal positioned adjacent the first bearing without encompassing the first bearing;
   a second bearing seal positioned adjacent the second bearing without encompassing the second bearing; and
   a preformed one-piece seal including a first endless loop engaging a peripheral surface of the first bearing seal, a second endless loop engaging a peripheral surface of the second bearing seal, and a first intermediate seal portion connected between the first and second endless loops.

2. The apparatus of claim 1, wherein the first bearing seal includes a first peripheral groove at least partially receiving the first endless loop and the second bearing seal includes a second peripheral groove at least partially receiving the second endless loop.

3. The apparatus of claim 1, wherein the one-piece seal includes a second intermediate seal portion connected between the first and second endless loops.

4. The apparatus of claim 3, wherein the first intermediate seal portion is connected to the first endless loop at a first location and the second intermediate seal portion is connected to the first endless loop at a second location opposed to the first location.

5. The apparatus of claim 4, wherein the first intermediate seal portion is connected to the second endless loop at a third location and the second intermediate seal portion is connected to the second endless loop at a fourth location opposed to the third location.

6. An apparatus including:
   a crankcase including a first bearing seat, a first bearing seal seat positioned adjacent the first bearing seat, a second bearing seat, and a second bearing seal seat positioned adjacent the second bearing seat;
   a crankshaft rotatable relative to the crankcase, the crankshaft provided with a first bearing engaging the first bearing seat and a second bearing engaging the second bearing seat;
   a first bearing seal positioned at least partially within the first bearing seal seat without encompassing the first bearing and a second bearing seal positioned at least partially within the second bearing seal seat without encompassing the second bearing; and
   a preformed one-piece seal including a first endless loop engaging a peripheral surface of the first bearing seal and engaging a surface of the first bearing seal seat, a second endless loop engaging a peripheral surface of the second bearing seal and engaging a surface of the second bearing seal seat, and a first intermediate seal portion connected between the first and second endless loops.

7. The apparatus of claim 6, wherein the crankcase includes a first groove extending between the first bearing seal seat and the second bearing seal seat, the first groove at least partially receiving the first intermediate seal portion.

8. The apparatus of claim 7, wherein the one-piece seal includes a second intermediate seal portion connected between the first and second endless loops and the crankcase includes a second groove extending between the first bearing seal seat and the second bearing seal seat, the second groove at least partially receiving the second intermediate seal portion.

9. The apparatus of claim 6, wherein the one-piece seal includes a second intermediate portion connected between the first and second endless loops.

10. The apparatus of claim 9, wherein the first intermediate seal portion is connected to the first endless loop at a first location and the second intermediate seal portion is connected to the first endless loop at a second location opposed to the first location.

11. The apparatus of claim 10, wherein the first intermediate seal portion is connected to the second endless loop at a third location and the second intermediate seal portion is connected to the second endless loop at a fourth location opposed to the third location.

12. The apparatus of claim 6, wherein the first bearing seal includes a first peripheral groove at least partially receiving the first endless loop and the second bearing seal includes a second peripheral groove at least partially receiving the second endless loop.

13. An apparatus including:
    a crankcase including a first bearing seat, a first bearing seal seat positioned adjacent the first bearing seat, a second bearing seat, and a second bearing seal seat positioned adjacent the second bearing seat;
    a crankshaft rotatable relative to the crankcase, the crankshaft provided with a first bearing at least partially received in the first bearing seat and a second bearing at least partially received in the second bearing seat;
    a first bearing seal at least partially positioned within the first bearing seal seat without encompassing the first bearing;
    a second bearing seal at least partially positioned within the second bearing seal seat without encompassing the second bearing; and
    a preformed one-piece seal including a first endless loop engaging a peripheral surface of the first bearing seal and engaging a surface of the first bearing seal seat, a second endless loop engaging a peripheral surface of the second bearing seal and engaging a surface of the second bearing seal seat, and a first intermediate seal portion connected between the first and second endless loops.

14. The apparatus of claim 13, wherein the first bearing engages the first bearing seat and the second bearing engages the second bearing seat.

15. The apparatus of claim 13, wherein the crankcase includes a first groove extending between the first bearing seal seat and the second bearing seal seat, the first groove at least partially receiving the first intermediate seal portion.

16. The apparatus of claim 15, wherein the one-piece seal includes a second intermediate seal portion connected between the first and second endless loops and the crankcase includes a second groove extending between the first bearing seal seat and the second bearing seal seat, the second groove at least partially receiving the second intermediate seal portion.

17. The apparatus of claim 13, wherein the first bearing seal includes a first peripheral groove at least partially receiving the first endless loop and the second bearing seal includes a second peripheral groove at least partially receiving the second endless loop.

18. The apparatus of claim 13, wherein the one-piece seal includes a second intermediate seal portion connected between the first and second endless loops.

19. The apparatus of claim 18, wherein the first intermediate seal portion is connected to the first endless loop at a first location and the second intermediate seal portion is connected to the first endless loop at a second location opposed to the first location.

20. The apparatus of claim 19, wherein the first intermediate seal portion is connected to the second endless loop at a third location and the second intermediate seal portion is connected to the second endless loop at a fourth location opposed to the third location.

* * * * *